(12) United States Patent
Fukami et al.

(10) Patent No.: US 8,979,182 B2
(45) Date of Patent: Mar. 17, 2015

(54) PANEL STRUCTURE FOR VEHICLE ROOF DEVICE AND WEATHER STRIP FOR VEHICLE ROOF DEVICE

(71) Applicant: Toyoda Gosei Co., Ltd., Kiyosu-shi, Aichi-ken (JP)

(72) Inventors: Kiyozumi Fukami, Chiryu (JP); Yuki Itsumi, Chiryu (JP); Masatoshi Nojiri, Kiyosu (JP)

(73) Assignee: Toyoda Gosei Co., Ltd., Aich-pref. (JP)

( * ) Notice: Subject to any disclaimer, the term of this patent is extended or adjusted under 35 U.S.C. 154(b) by 0 days.

(21) Appl. No.: 14/143,141

(22) Filed: Dec. 30, 2013

(65) Prior Publication Data

US 2014/0197665 A1 Jul. 17, 2014

(30) Foreign Application Priority Data

Jan. 15, 2013 (JP) ................. 2013-004803

(51) Int. Cl.
*B60J 10/12* (2006.01)
*B60J 7/043* (2006.01)
*B60J 10/00* (2006.01)

(52) U.S. Cl.
CPC ............ *B60J 10/12* (2013.01); *B60J 10/0005* (2013.01); *B60J 10/0031* (2013.01); *B60J 10/0062* (2013.01)

USPC .................................................. 296/216.09

(58) Field of Classification Search
CPC ....................................................... B60J 10/12
USPC ................... 296/216.06, 216.09; 49/490.1
See application file for complete search history.

(56) References Cited

U.S. PATENT DOCUMENTS 8,152,229 B2 * 4/2012 Horiuchi et al. ......... 296/216.09

FOREIGN PATENT DOCUMENTS

JP 2004-243792 A 9/2004
JP 2009-6775 * 1/2009

* cited by examiner

*Primary Examiner* — Dennis H Pedder
(74) *Attorney, Agent, or Firm* — Posz Law Group, PLC

(57) ABSTRACT

A panel structure for a vehicle roof device includes a holder portion and a weather strip. The holder portion includes a fitting protrusion having a narrowed portion. The weather strip includes, in an integral manner, an attaching base and a sealing portion. The attaching base has a fitting recess fitted to the fitting protrusion. The attaching base includes a body portion in close contact with an outer side surface of the fitting protrusion, an upper attaching portion in close contact with an upper outer side surface of the narrowed portion, and a lower attaching portion in close contact with a lower outer side surface of the narrowed portion. The thickness of the upper attaching portion in the upper end is set to be larger in an upper area than in a lower area.

7 Claims, 3 Drawing Sheets

| No. | Configuration | Retaining force of Fitting Portion | Assembly Workability | Influence on Body Snapping Noise | Evaluation |
|---|---|---|---|---|---|
| 1 | Without Curved Portion | ○ | △ | △ | 4 |
| 2 | With Upper Curved Portion | ◎ | △ | △ | 5 |
| 3 | With Lower Curved Portion | △ | △ | △ | 3 |
| 4 | With Upper and Lower Curved Portions | ○ | △ | △ | 4 | ns 
PANEL STRUCTURE FOR VEHICLE ROOF DEVICE AND WEATHER STRIP FOR VEHICLE ROOF DEVICE

BACKGROUND OF THE INVENTION

The present invention relates to a panel structure for a vehicle roof device and a weather strip for a vehicle roof device.

A conventional panel structure for a vehicle roof device is described in Japanese Laid-Open Patent Publication No. 2004-243792, for example. As shown in FIG. 6, the panel structure includes a panel body 91 made of a glass material, a holder portion 92 that is attached to the entire outer periphery of the panel body 91 and is made of a plastic material, and a frame-like weather strip 93 fitted to the entire outer periphery of the holder portion 92. The outer periphery of the holder portion 92 is provided with a fitting protrusion 92a that protrudes outwardly and has a substantially T-shaped cross section. The weather strip 93 includes an attaching base 94 made of solid rubber and a sealing portion 95 that is integrated with the attaching base 94 and is made of sponge rubber. The attaching base 94 is provided with a fitting recess 94a that corresponds to the fitting protrusion 92a and has a substantially T-shaped cross section. The weather strip 93 is fixed to the panel body 91 via the holder portion 92 by fitting the fitting protrusion 92a to the fitting recess 94a.

SUMMARY OF THE INVENTION

For example, during ejection of high-pressure cleaning liquid from above a vehicle roof during cleaning of a vehicle, the high-pressure cleaning liquid may enter between the holder portion 92 and the weather strip 93. In such a case, the weather strip 93 may be peeled off the holder portion 92 due to the pressure of the cleaning liquid. Therefore, it is desired to increase the retaining force of the weather strip 93 at the fitting portion between the fitting recess 94a and the fitting protrusion 92a.

An objective of the present invention is to provide a panel structure for a vehicle roof device and a weather strip for a vehicle roof device that increase the retaining force of the weather strip at a fitting portion between a fitting protrusion protruding from a holder portion of a panel body and a fitting recess formed in an attaching base of the weather strip.

To achieve the foregoing objective and in accordance with one aspect of the present invention, a panel structure for a vehicle roof device is provided that includes a panel body provided over an opening of a vehicle roof, a holder portion joined to an outer periphery of the panel body, and weather strip. The holder portion is provided with a fitting protrusion having a narrowed portion. The fitting protrusion protrudes toward the outside of the panel body. The weather strip includes, in an integral manner, an attaching base and a sealing portion. The attaching base is provided with a fitting recess fitted to the fitting protrusion of the holder portion and the sealing portion being elastically contactable with a rim of the opening of the vehicle roof. The attaching base of the weather strip includes a body portion in close contact with an outer side surface of the fitting protrusion of the holder portion, an upper attaching portion connected to an upper end of the body portion, and a lower attaching portion connected to a lower end of the body portion. The upper attaching portion protrudes toward the panel body and is in close contact with an upper part of the narrowed portion. The lower attaching portion protrudes toward the panel body and is in close contact with a lower part of the narrowed portion. The fitting recess is defined by the body portion, the upper attaching portion, and the lower attaching portion. The thickness of the body portion in the upper end is set to be larger in an upper area than in a lower area of the upper end.

DETAILED DESCRIPTION OF THE PREFERRED EMBODIMENTS

One embodiment of the present invention will be described below.

Figure 1:
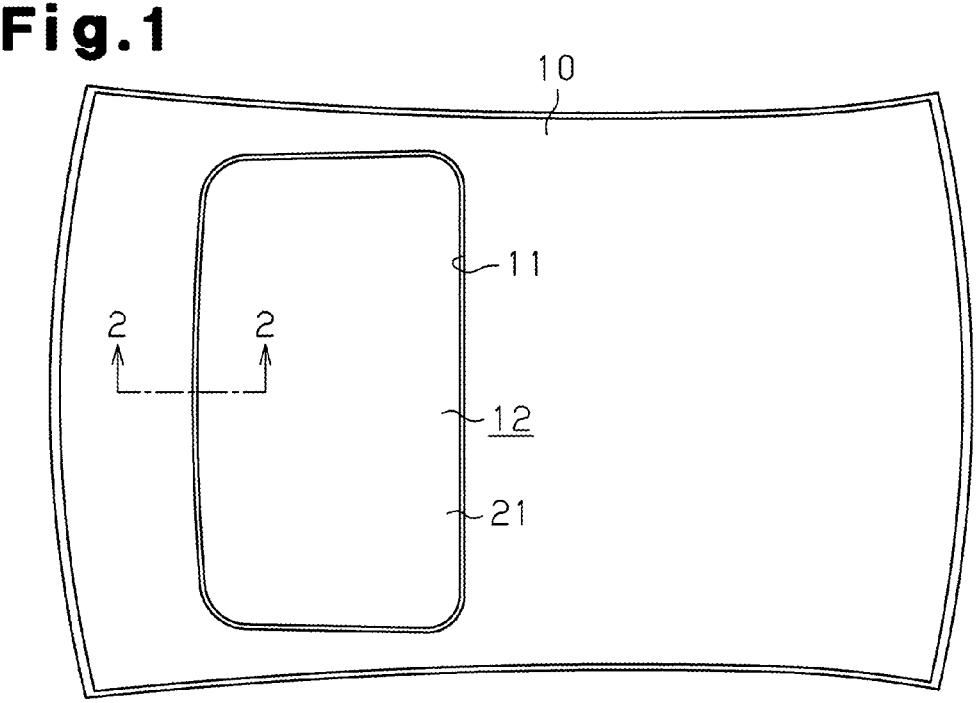
FIG. 1 is a plan view showing an embodiment of the present invention.

As shown in FIG. 1, a vehicle roof 10 of an automobile or the like has a substantially rectangular opening 11, and a substantially rectangular vehicle panel 12 capable of opening and closing the opening 11. The vehicle panel 12 includes a substantially rectangular panel body 21 made of a glass material to fit to the opening 11.

Figure 2:
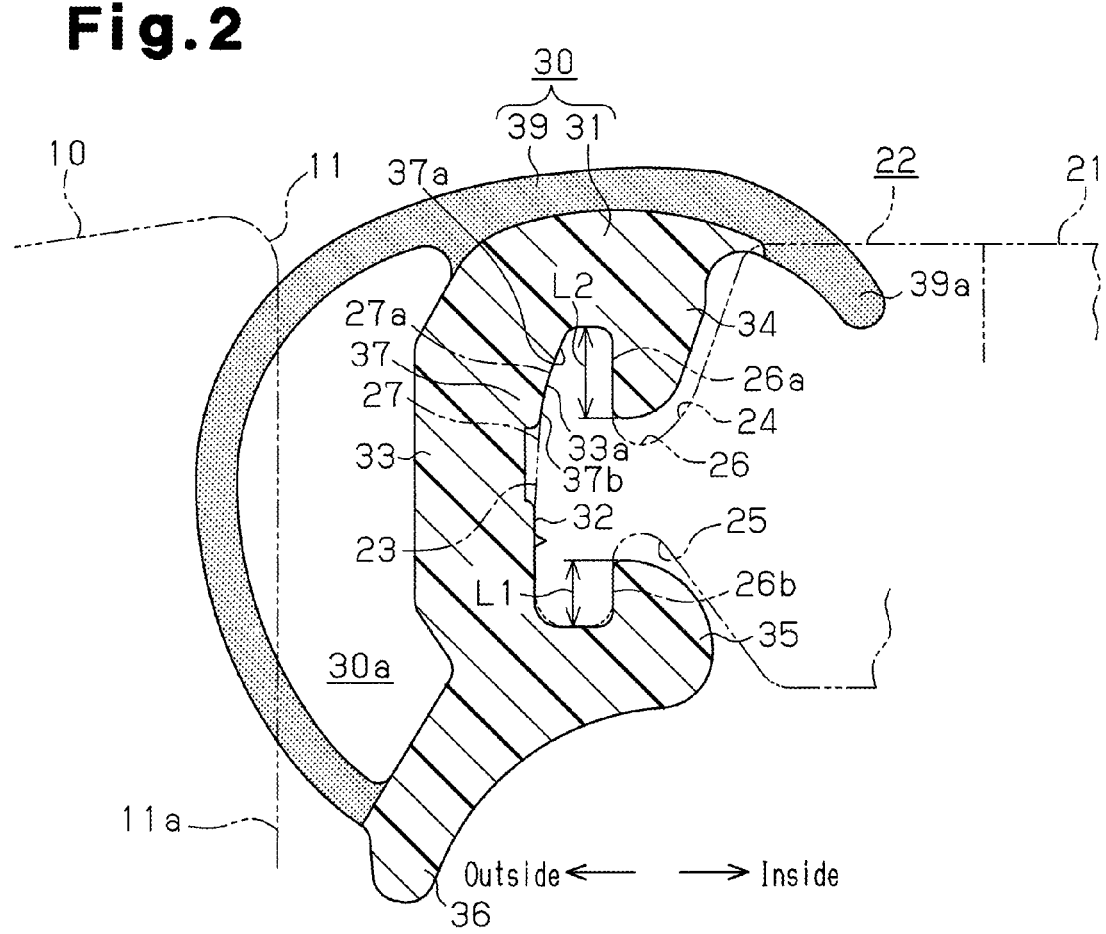
FIG. 2 is a cross-sectional view taken along line 2-2 in FIG. 1.

As shown in FIG. 2, the opening 11 has a substantially flange-like rim 11a formed by bending its inner periphery downward. Accordingly, the rim 11a of the opening 11 is shaped like a substantially rectangular tube as a whole.

The vehicle panel 12 includes a holder portion 22 that is joined to the outer periphery of the panel body 21 and is made of synthetic plastic, for example. The holder portion 22 is provided with a fitting protrusion 23 protruding toward the outside of the panel body 21. An upper groove 24 and a lower groove 25, each having a substantially U-shaped cross section, are formed in a basal end of the fitting protrusion 23 such that the fitting protrusion 23 has a substantially T-shaped cross section. In other words, the holder portion 22 has a narrowed portion 26 between the upper groove 24 and the lower groove 25, and an engaging portion 27 having a width gradually increasing in the vehicle height direction on the outer side of the narrowed portion 26. The engaging portion 27 has an almost uniform thickness, but a guide 27a curved to gradually decrease the thickness of the engaging portion 27 toward the upside is formed on an upper outer side of the engaging portion 27. The depression amount of the upper groove 24 is larger than the depression amount of the lower groove 25.

A weather strip 30 is fitted to the holder portion 22. The weather strip 30 integrally has an attaching base 31 made of solid rubber and a sealing portion 39 made of sponge rubber, which is elastically contactable with the rim 11a of the opening 11 of the vehicle panel 12. The attaching base 31 has a fitting recess 32, which is fitted to the fitting protrusion 23 and has a substantially T-shaped cross section. Examples of materials for the solid rubber and the sponge rubber include synthetic rubber such as EPDM rubber and thermoplastic elastomer.

The attaching base 31 has a body portion 33 in close contact with an outer side surface of the fitting protrusion 23 (the engaging portion 27), a substantially claw-like upper attaching portion 34, which is connected to the upper end of the body portion 33 and protrudes toward the inside of the panel body 21, and a substantially claw-like lower attaching portion 35, which is connected to the lower end of the body portion 33 and protrudes toward the inner side. The body portion 33, the upper attaching portion 34, and the lower attaching portion 35 are integrated together. The upper attaching portion 34 is in close contact with the upper surface of the engaging portion 27 and an upper outer side surface 26a of the narrowed portion 26 (upper inner side surface of the engaging portion 27), and the lower attaching portion 35 is in close contact with the lower surface of the engaging portion 27 and the lower outer side surface 26b of the narrowed portion 26 (lower inner side surface of the engaging portion 27). The fitting recess 32 is defined by the body portion 33, the upper attaching portion 34, and the lower attaching portion 35.

The body portion 33 has an almost uniform thickness, but an upper end 37 is thicker in an upper area 37a than in a lower area 37b. The body portion 33 has a curved portion 33a, which gradually increases the thickness of the body portion 33 toward the upside in line with the guide 27a of the engaging portion 27 (fitting protrusion 23). The almost uniform thickness of the body portion 33 is set based on the stiffness required for the body portion 33. The upper attaching portion 34 extends downward up to the height position corresponding to the start point of the curved portion 33a in the lower area 37b. This intends to increase the engaging margin of the upper outer side surface of the narrowed portion 26 with the upper attaching portion 34, thereby increasing the retaining force of the weather strip 30 at the fitting portion between the fitting protrusion 23 and the fitting recess 32. In accordance with the difference between the upper groove 24 and the lower groove 25 in depression amount, an upward extending length L1 of the lower attaching portion 35 is set to be smaller than a downward extending length L2 of the upper attaching portion 34. By making the lower attaching portion 35 shorter, the narrowed amount of the holder portion 22 in the lower part of the narrowed portion 26 is decreased. This increases the thickness of the holder portion 22 in the narrowed portion 26 in the vehicle height direction.

The attaching base 31 has an extending portion 36 extending outward in the obliquely downward direction from the lower outer part of the lower attaching portion 35. The sealing portion 39 is molded to have a substantially arcuate cross section, is placed on an upper surface of the attaching base 31, and is joined to the extending portion 36 at its lower end. The sealing portion 39 and an outer side surface of the attaching base 31 define a hollow portion 30a having a substantially D-shaped cross section therebetween. The sealing portion 39 has a tongue-like lip 39a protruding toward the inside of the vehicle further than the upper surface of the attaching base 31, and the lip 39a elastically contacts an upper surface of the holder portion 22.

Next, operation of the present embodiment will be described.

In the present embodiment, the upper end 37 of the body portion 33 is set to be thicker in the upper area 37a than in the lower area 37b by providing the curved portion 33a in the upper end 37. Thus, when high-pressure cleaning liquid is ejected from above the vehicle roof 10, the weather strip 30 is hard to peel off the holder portion 22. The fact is based on the results of experimentation using the weather strip 30 in this embodiment, which is represented by a solid line in FIG. 3, and a conventional weather strip 80 in Japanese Laid-Open Patent Publication No. 2004-243792, which is represented by broken line in which a long dash alternates with a pair of short dashes in FIG. 3. The conventional weather strip 80 has basically the same configuration as the weather strip 30 in this embodiment, but has a flat surface 80a extending in the vehicle height direction, in place of the curved portion 33a. When the high-pressure cleaning liquid was ejected from above the vehicle roof 10 and then, behavior of the weather strip 30 was compared with that of the weather strip 80, it was discovered that the weather strip 30 in this embodiment was harder to peel off the holder portion 22 than the conventional weather strip 80, that is, the retaining force at the fitting portion between the fitting protrusion 23 and the fitting recess 32 improved.

Figures 3, 4:
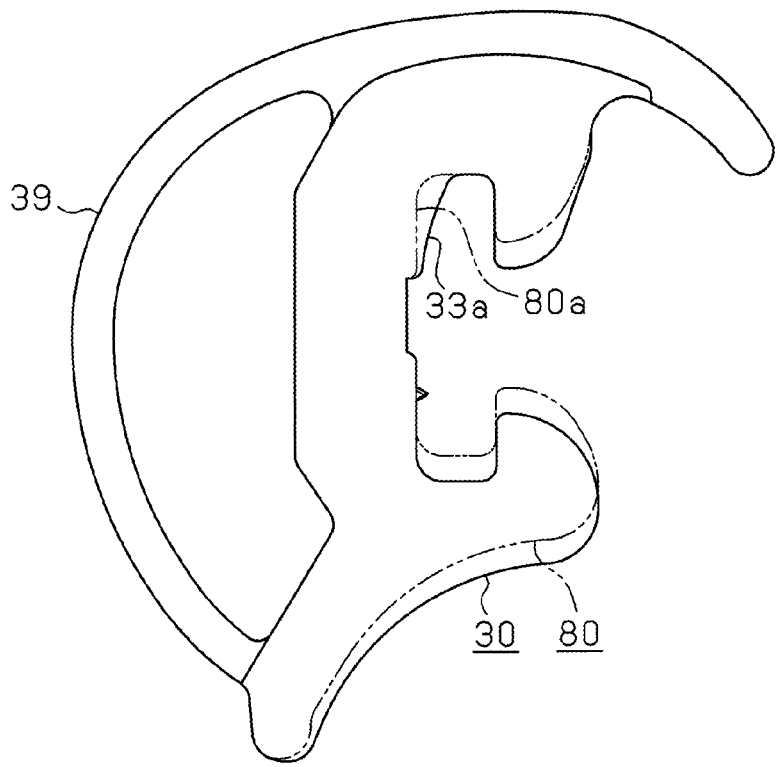
FIG. 3 is a cross-sectional view showing a structure of the embodiment in comparison with a conventional example.
FIG. 4 is a table showing experimental evaluation of characteristics in various modifications of the conventional example.

FIG. 4 shows experimental results on modifications of the conventional weather strip 80 and effects of the modifications on features including the retaining force at the fitting portion at ejection of the high-pressure cleaning liquid. In example No. 1 of the table, an upper attaching portion without the curved portion 33a was formed in the body portion to increase an engaging margin between the upper attaching portion and the upper outer side surface of the narrowed portion 26. Example No. 2 corresponds to the above described embodiment, and in this example, the body portion had the curved portion 33a. In example No. 3, in place of the curved portion 33a in the embodiment, a similar curved portion was provided on the inner side of the lower end of the body portion. In example No. 4, in addition to the curved portion 33a in the embodiment, a similar curved portion was provided on the inner side of the lower end of the body portion. In each of the examples, effects on the retaining force at the fitting portion, assembly workability, and body snapping noise were evaluated. Legends "⊚", "○", and "Δ," represent "favorable", "good", and "somewhat good" in evaluation of each item with compared to the conventional weather strip 80. Integrated evaluation of each example is represented in five grades in the evaluation column.

According to this table, as for the retaining force at the fitting portion at ejection of the high-pressure cleaning liquid, forming the curved portion 33a only in the upper attaching portion as in example No. 2 is the most effective. The second effective are increasing in the engaging margin with the upper outer side surface of the narrowed portion 26 and forming of the similar curved portion on the inner side of the lower end of the body portion in addition to the curved portion 33a as in the examples No. 1 and No. 4.

As for the assembly workability, the workability in the case where the weather strip is pressed onto the holder portion 22 to fit the fitting recess to the fitting protrusion was examined. The body snapping noise refers to noise that is generated, in the case where the vehicle panel 12 for opening and closing the opening 11 is an inner sliding type, when the vehicle panel 12 is inclined, the rim 11a is pressed toward the attaching base via the sealing portion and is dented, and then, elastically returns due to release from the vehicle panel 12 along with the opening operation. As apparent from FIG. 4, concerning the effects on the assembly workability and the body snapping noise, although improvements from the conventional weather strip 80 were found, there was no difference among examples No. 1 to No. 4.

Therefore, it was comprehensively found out that forming the curved portion on the inner side of the upper end of the body portion was the most effective.

As described above, the illustrated embodiment achieves following advantages.

(1) In this embodiment, the thickness of the upper end 37 of the body portion 33 is set to be larger in the upper area 37a than in the lower area 37b. Thus, when the high-pressure cleaning liquid is ejected from above the vehicle roof 10, the retaining force at the fitting portion between the fitting protrusion 23 and the fitting recess 32 is increased.

(2) In this embodiment, by extending the upper attaching portion 34 downward up to the height position of the lower area 37b in the vehicle height direction (the position of the start point of the curved portion 33a), the upper attaching portion 34 in close contact with the upper outer side surface 26a of the narrowed portion 26 is lengthened. Thus, the engaging margin between the upper outer side surface 26a and the upper attaching portion 34 is increased. In turn, the retaining force of the weather strip 30 at the fitting portion between the fitting protrusion 23 and the fitting recess 32 is increased. Especially, the resistance caused when the weather strip 30 is detached from the holder portion 22 in the substantially horizontal direction is increased. This resistance is further increased by providing the curved portion 33a in the body portion 33.

(3) In this embodiment, the upward extending length of the lower attaching portion 35 is set to be smaller than the downward extending length of the upper attaching portion 34. Accordingly, since the lower attaching portion 35 in close contact with the lower outer side surface 26b of the narrowed portion 26 becomes smaller, the narrowed amount of the holder portion 22 in the lower part of the narrowed portion 26 is reduced. Accordingly, the thickness of the holder portion 22 in the narrowed portion 26 in the vehicle height direction is further increased, thereby increasing the stiffness of the holder portion 22.

(4) In this embodiment, by changing the shape of the attaching base 31 and the holder portion 22, the retaining force at the fitting portion between the fitting protrusion 23 and the fitting recess 32 is increased without changing any decorative appearance.

(5) In this embodiment, since the thickness of the body portion 33 (attaching base 31) is not increased outwardly toward the hollow portion 30a, a sufficient gap from the rim 11a via the sealing portion 39 is ensured, suppressing the occurrence of body snapping noise.

(6) In this embodiment, the fitting protrusion 23 (engaging portion 27) is provided with the guide 27a in line with the curved portion 33a of the attaching base 31 (body portion 33). Accordingly, when the weather strip 30 is pressed onto the holder portion 22 to fit the fitting recess 32 to the fitting protrusion 23, the guide 27a can guide elastic deformation of the upper attaching portion 34. This improves the workability in fitting the fitting recess 32 to the fitting protrusion 23.

The embodiment may be modified as follows.

Figure 5:
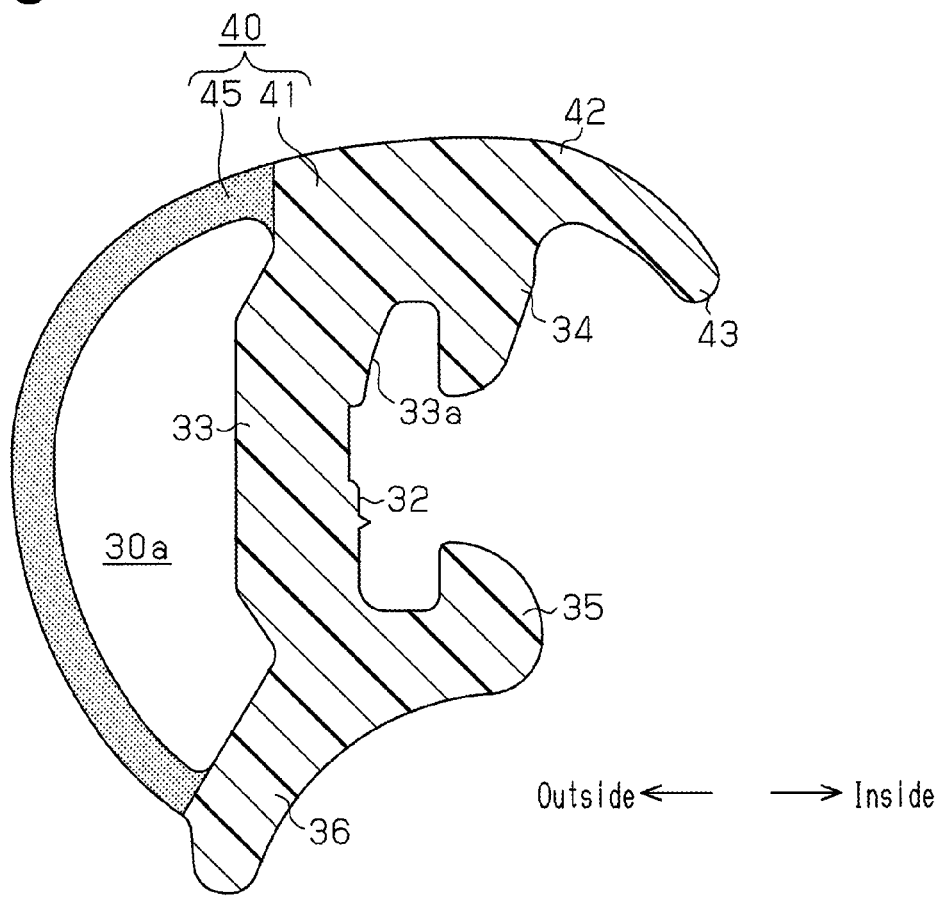
FIG. 5 is a cross-sectional view showing a modification of the present invention.
Figure 6:
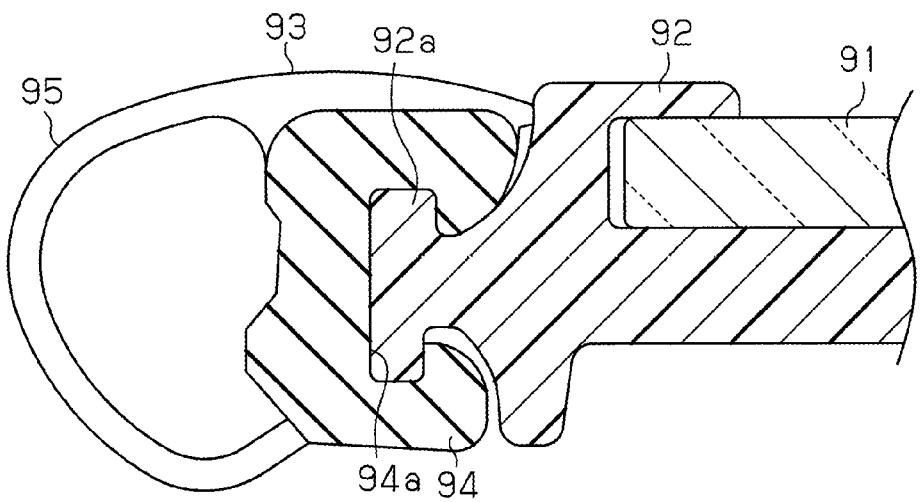
FIG. 6 is a cross-sectional view showing the conventional example.

As shown in FIG. 5, a weather strip 40 may include a sealing portion 45 formed integrally with an attaching base 41 on the outer side from an outer end of the attaching base 41. That is, the attaching base 41 made of solid rubber includes a top portion 42 and a lip 43, which cover the upper surface of the upper attaching portion 34, in an integral manner. The sealing portion 45 is molded to have a substantially arcuate cross section, is joined to a front end of the top portion 42 at its upper end, and is joined to the extending portion 36 at its lower end. Through these modifications, the attaching base 41 itself forms its upper surface (ornamental surface), and extends in the vehicle height direction. Thereby, the stiffness of the attaching base 41 is increased to further increase the retaining force of the weather strip 40 at the fitting portion between the fitting protrusion 23 and the fitting recess 32.

In the embodiment, the upward extending length L1 of the lower attaching portion 35 may be set to be equal to or larger than the downward extending length L2 of the upper attaching portion 34.

In the embodiment, the upper attaching portion 34 may extend downward without being restricted by the position corresponding to the start point of the curved portion 33a.

In the embodiment, as long as the thickness of the upper end of the body portion 33 is set to be larger in the upper area 37a than in the lower area 37b, the curved portion 33a is not necessarily provided. For example, the upper area 37a may be thicker than the lower area 37b in a stepped manner. Alternatively, the upper end 37 may have a linear cross section.

The invention claim is:

1. A panel structure for a vehicle roof device, the panel structure comprising:
   a panel body provided within an opening in a vehicle roof;
   a holder portion joined to an outer periphery of the panel body, the holder portion including a fitting protrusion extending outwardly from the panel body and terminating in an engaging portion and having a narrowed portion between the engaging portion and the panel body, a thickness of the narrowed portion being smaller than a thickness of the engaging portion; and
   a weather strip comprises an integrated structure including an attaching base securing the weather strip to the holder portion and a sealing portion elastically contacting a rim arranged about a periphery of the opening in the vehicle roof, the attaching base including a fitting recess fitted to the fitting protrusion of the holder portion;
   the fitting recess of the attaching base of the weather strip comprising:
      a body portion including a curved portion in close contact with an outer side surface of the engaging portion of the fitting protrusion of the holder portion;
      an upper attaching portion and a lower attaching portion respectively connected to an upper end and a lower end of the body portion, the upper and lower attaching portions protruding toward the panel body and toward the narrowed portion of the fitting protrusion and respectively being in close contact with an upper part and a lower part of the narrowed portion,
   wherein the curved portion of the body portion extends within and between an upper area and a lower area contained within the upper end of the body portion and a thickness of the upper end of the body portion gradually increases in the direction from the lower area toward the upper area of the upper end and toward the panel body.

2. The panel structure for a vehicle roof device according to claim 1, wherein the upper attaching portion of the weather strip extends downward to a position opposed to the lower area of the upper end of the body portion.

3. The panel structure for a vehicle roof device according to claim 2, wherein an upward extending length of the lower attaching portion is smaller than a downward extending length of the upper attaching portion.

4. The panel structure for a vehicle roof device according to claim 1, wherein a part of the sealing portion of the weather strip is located other than at an outer end of the attaching base.

5. A weather strip for a vehicle roof device, the vehicle roof device including:
   a panel body; and
   a holder portion joined to an outer periphery of the panel body, wherein
   the holder portion has a fitting protrusion,
   the fitting protrusion protrudes toward the outside of the panel body, terminates in an engaging portion and has a narrowed portion provided between the engaging portion and the panel body, a thickness of the narrowed portion being smaller than a thickness of the engaging portion;

the weather strip comprises an integrated structure including an attaching base securing the weather strip to the holder portion and a sealing portion elastically contacting a rim arranged about a periphery of an opening in a vehicle roof, the attaching base has a fitting recess fitted to the engaging portion of the fitting protrusion of the holder portion, and the fitting recess includes:

- a body portion including a curved portion in close contact with an outer side surface of the engaging portion of the fitting protrusion of the holder portion,
- an upper attaching portion and a lower attaching portion respectively connected to an upper end and a lower end of the body portion, the upper and lower attaching portions protruding toward the panel body and toward the narrowed portion of the fitting protrusion and the panel body and respectively being in close contact with an upper part and a lower part of the narrowed portion, wherein the curved portion of the body portion extends within and between an upper area and a lower area contained within the upper end of the body portion and a thickness of the upper end of the body portion gradually increases in the direction from the lower area toward the upper area and toward the panel body.

6. The panel structure for a vehicle roof device according to claim 1, wherein the engaging portion of the fitting protrusion adjacent the curved portion of the body portion has a gradually decreasing thickness matching the gradually increasing thickness of the upper end of the body portion.

7. The weather strip for a vehicle roof device according to claim 5, wherein engaging portion of the fitting protrusion adjacent the curved portion of the body portion has a gradually decreasing thickness matching the gradually increasing thickness of the upper end of the body portion.

* * * * *